Jan. 14, 1969    J. R. BERRYHILL    3,421,195
CAPACITOR AND METHOD OF MAKING SAME
Filed Dec. 23, 1965

INVENTOR
JOHN R. BERRYHILL
BY
ATTORNEYS

United States Patent Office 3,421,195
Patented Jan. 14, 1969

3,421,195
CAPACITOR AND METHOD OF MAKING SAME
John R. Berryhill, Madison, Wis., assignor to Dale Electronics, Inc., Columbus, Nebr., a corporation of Nebraska
Filed Dec. 23, 1965, Ser. No. 515,817
U.S. Cl. 29—25.42    4 Claims
Int. Cl. H01g 13/00

ABSTRACT OF THE DISCLOSURE

A rutile capacitor and the method of making the capacitor involving converting rutile material to a semiconductor by reducing out a small fraction of its constituent oxygen and then reoxidizing the surface of the reduced rutile crystal by an electrical chemical means, oxidization, to provide a micro thin dielectric layer of micro thin insulating $TiO_2$.

---

Rutile is one of the three crystalline forms of titanium dioxide ($TiO_2$). Although rutile is normally an excellent electrical insulator, it is possible to convert the material to a semiconductor by reducing out a small fraction of the constituent oxygen.

Therefore, it is a principal object of this invention to provide a capacitor wherein a body of electrical conductive rutile is employed as an electrode.

A further object of this invention is to provide a capacitor wherein a body of electrical conductive rutile is employed as an electrode and has a dielectric layer of titanium dioxide infused thereon.

A further object of this invention is to describe a method of making a capacitor.

A further object of this invention is to describe a method of infusing a dielectric layer of titanium dioxide on the surface of a body of electrical conductive rutile.

A further object of this invention is to provide a capacitor wherein the electrode and dielectric are of one-piece construction.

A further object of this invention is to provide a capacitor having a dielectric layer and electrode having identical coefficients of thermal expansion.

A further object of this invention is to provide a capacitor having an improved ratio of capacitance to capacitor area.

A further object of this invention is to provide a capacitor with high capacitance values.

A further object of this invention is to provide a capacitor which is more easily manufactured than present capacitors.

A further object of this invention is to provide a capacitor which is durable in use, refined in appearance and economical of manufacture.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

Rutile is one of the three crystalline forms of titanium dioxide ($TiO_2$). The other two crystalline forms of titanium dioxide are brookite and anatase. The three crystalline forms of titanium dioxide differ from one another in their physical and electrical properties. Brookite and anatase are less stable than rutile and tend to transform into rutile at elevated temperatures and are inferior in their electrical properties as they relate to the construction of capacitors. The dielectric constant of single crystal rutile is between 80 and 180, depending on the crystal orientation thereof, and the dielectric constant of polycrystalline rutile is in excess of 110. However, the dielectric constants of brookite and anatase are considerably lower than the dielectric constant of rutile.

As stated before, rutile is normally an electrical insulator. However, it is possible to convert the rutile material to a semi-conductor by reducing out a small fraction of its constituent oxygen. Rutile is reduced by heating it to in excess of 600 degrees C. in a hydrogen or other reducing atmosphere or in a vacuum. It is possible to produce rutile having electrical resistivity in the range of $10^{14}$ ohm-cm. to less than 1 ohm-cm. by controlling the exposure of the rutile to the reducing process. The amount of oxygen removed from the rutile by reduction is undetectable by chemical or X-ray methods but the reduction process imparts to the rutile a blue color which becomes darker and more opaque as the electrical resistivity thereof decreases which serves to indicate the extent of reduction. It has been determined that the form of rutile most adaptable for use in capacitors as described herein is the dark blue-low resistivity type which would have an electrical resistivity of less than 10 ohm-cm.

Figure 4:
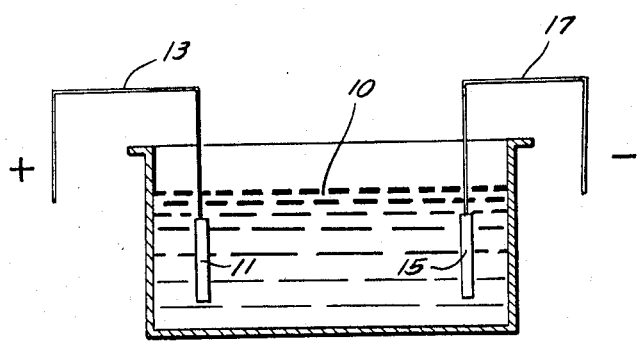
FIG. 4 is a schematic view illustrating the manner in which the electrical conductive rutile is reoxidized to form a dielectric titanium dioxide layer thereon.

After the body of rutile has been reduced by the method described above until the rutile has become dark blue in color, the rutile will then be a semi-conductor and not an insulator. The surface of the rutile is then reoxidized in the following manner and as depicted in FIG. 4. In FIG 4, the numeral 10 generally designates a bath of liquid electrolyte from which oxygen can be produced. As stated before, the liquid electrolyte may consist of any electrolyte from which oxygen can be produced of which tartaric acid and oxalic acid are two suitable liquid electrolytes which may be employed.

The previously reduced rutile body 11 is connected to a source of electrical current by a wire 13 in any convenient fashion and immersed in the bath 10. An electrode 15 is connected to the source of electrical current by a wire 17 in any convenient fashion and is also immersed in the bath. Electrode 15 may be comprised of any suitable material such as titanium or platinum. In the reoxidation process, rutile body 11 serves as the electrically positive electrode or anode and the electrode 15 serves as the electrically negative electrode or cathode.

The source of electrical current is then energized so as to cause electrical current to flow between the reduced rutile body 11 and the electrode 15 through the bath 10. The electrical current flowing through the bath 10 causes oxygen to be produced and infused into the surface of the reduced rutile body thereby forming a layer of reoxidized titanium dioxide ($TiO_2$) thereon. The layer of reoxidized titanium dioxide is an electrical insulator and will serve as a dielectric as will be explained later.

Figure 1:
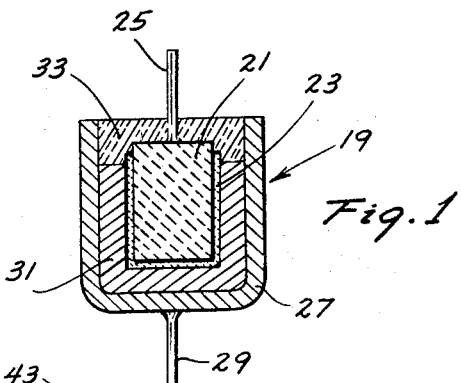
FIG. 1 is a sectional view of an electrolytic capacitor employing an electrical conductive rutile electrode with an insulating titanium dioxide dielectric electrochemically formed thereon.

With respect to FIG. 1, the numeral 19 generally designates an electrolytic capacitor incorporating an electrode and dielectric film thereon produced by the method described herein. The numeral 21 designates a reduced rutile electrode having a titanium dioxide dielectric film 23 formed electrochemically thereon as previously described. A terminal 25 is operatively secured to rutile electrode 21 and extends therefrom. Electrode 21 is enclosed within a metal case to which a terminal 29 is operatively secured and extends therefrom. A solid or liquid electrically conductive electrolyte 31 surrounds the titanium dioxide dielectric film and is in intimate electrical contact therewith. Electrolyte 31 may be comprised of any suitable material well known in the art of manufacturing electrolytic capacitors. An insulating seal 33 is provided in capacitor 19 to prevent the electrode 21 or film 23 from directly contacting the metal case 27.

Figure 2:
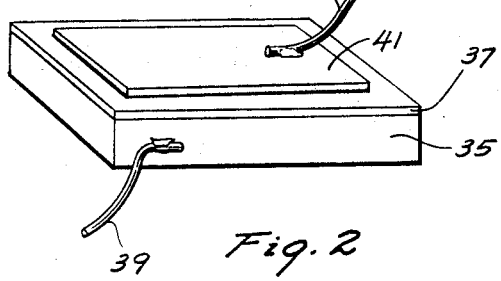
FIG. 2 is a perspective view of an electrostatic capacitor employing an electrical conductive rutile electrode with an insulating titanium dioxide dielectric electrochemically formed thereon.

FIG. 2 illustrates one manner in which a reduced rutile electrode and dielectric film formed thereon may be employed in a capacitor of the electrostatic type.

The numeral 35 designates the reduced rutile electrode having a titanium dioxide dielectric film 37 formed thereon as previously described. An electrical terminal 39 is operatively secured to electrode 35 at any suitable location by any convenient means. The titanium dioxide dielectric film is in intimate electrical contact with a conducting layer or counter-electrode 41 to which a terminal 43 has been operatively secured at a suitable location. The counter-electrode 41 may be formed of a metal in any of several known ways, such as by vacuum deposition, sputtering or pyrolysis.

Figure 3:
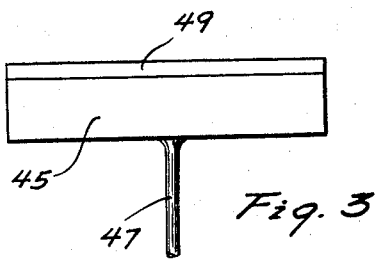
FIG. 3 is a side view of a body of electrical conductive rutile having an insulating titanium dioxide dielectric layer electrochemically formed thereon.

With respect to FIG. 3, there is illustrated a body of conductive, non-stoichiometric rutile 45 to which an electrical contact or terminal 47 has been secured at some point by any convenient means. The numeral 49 generally designates a layer or film of insulating titanium dioxide infused on a portion of the surface of rutile 45 by the electrochemical method of this invention. It should be noted that the dielectric titanium dioxide layer 49, which is in reality at most a few thousand Angstroms thick, has been exaggerated in its relative thickness, for purposes of clarity in this and other figures in the drawings.

Presently, electrolytic capacitors are commonly produced by the anodization of aluminum or tantalum to form a dielectric film on an electrode. Aluminum is the material that has been used for the longest period of time, but the introduction of tantalum has resulted in substantial improvements in capacitors, notably in the ratio of capacitance to capacitor area, which permits a capacitor of given value to have a physically smaller size.

Capacitors utilizing anodized conductive rutile are commercially competitive with tantalum electrolytic capacitors. In such matters as dissipation constant, insulation resistance, and the temperature and frequency dependence of both of these properties and the capacitance itself, capacitors based on anodized conductive rutile are vastly superior to capacitors based on anodized tantalum. In regard to the ratio of capacitance to capacitor area, and hence a matter of physical size, anodized conductive rutile displays superior qualities over tantalum. The price of raw titanium dioxide is approximately two-thirds the cost of raw tantalum thereby permitting an economical manufacturing process.

Titanium has also been anodized previously but has been found to be not suited for exploitation in capacitors. The poor quality of anodized titanium films is attributed to the disparity between the dimension of the crystal structure of titanium and that of $TiO_2$, as a result of which anodization cannot proceed to any great depth into the metal. It has been established that the oxide film formed by the anodization of titanium metal is chemically $TiO_2$, but of the brookite or anatase form. In the anodization process of this invention, a small proportion of oxygen is infused into an already nearly complete rutile structure. Therefore, a rutile dielectric is presumably achieved. In the instant invention then, the crystal structure of the electrode and the dielectric are precisely the same.

From an atomic or crystal structure point of view, the only difference between electrical conductive rutile and electrical insulating rutile is the fact that in conductive rutile, a few atoms of oxygen (of the order of one in a million) are missing. While this minute oxygen deficiency has a profound effect on the electrical conductivity and optical absorption of the material, it does not produce any change in most physical and chemical properties thereof. For example, the capacitor structure described herein is unique in that the dielectric layer and the electrode on which it is electro-chemically formed have identical coefficients of thermal expansion. Therefore, the possibility of detrimental effects due to the strains induced in the dielectric by differences in thermal expansion is eliminated which permits an extended permissible range of operating temperature.

Thus it can be seen that a unique capacitor and method method of producing the same has been described herein. The capacitor of the invention is superior to existing capacitors and is more economical of manufacture. Thus it can be seen that the device accomplishes at least all of its stated objectives.

Some changes may be made in the construction and arrangement of my capacitor and method of making same without departing from the real spirit and purpose of my invention, and it is my intention to cover by my claims, any modified forms of structure or use of mechanical equivalents which may be reasonably included within their scope.

I claim:

1. The method of making a capacitor, comprising the following steps, taking a body of electrical insulating rutile, removing a quantity of oxygen from the body of rutile by reduction thereby causing the body of rutile to be electrically conductive, securing an electrical contact to the reduced body of rutile, and forming a layer of electrical insulating material on a surface of the body of rutile directly after the reduction step by the following steps:

immersing the body of rutile in a bath of liquid electrolyte from which oxygen may be produced, connecting the body of rutile to a source of electrical energy, immersing an electrode in the bath and connecting the electrode to the source of electric energy, said body of rutile comprising an electrically positive anode, said electrode comprising the electrically negative cathode, causing electrical current to flow between the body of rutile and the electrode through the bath whereby oxygen is produced from the bath and infused into the body of rutile thereby forming an insulating dielectric film of reoxidized titanium dioxide thereon having the same crystal structure as the body of the rutile.

2. The method of claim 1 wherein the quantity of oxygen is removed from the rutile by heating the rutile to a temperature in excess of 600° C. in a reducing atmosphere.

3. The method of claim 1 wherein the quantity of oxygen is removed from the rutile by heating the rutile to a temperature in excess of 600° C. in a vacuum.

4. The method of claim 1 wherein the layer of re-oxidized titanium dioxide is comprised of rutile.

References Cited

UNITED STATES PATENTS

| | | |
|---|---|---|
| 2,633,543 | 3/1953 | Hawatt. |
| 3,028,447 | 4/1962 | Flaschen et al. |
| 3,121,830 | 2/1964 | Hollander et al. _____ 317—258 |
| 3,166,693 | 1/1965 | Haring et al. _____ 317—230 |
| 3,320,494 | 5/1967 | Riley _____ 317—230 |

JAMES D. CALLAM, *Primary Examiner.*

U.S. Cl. X.R.

29—570; 317—230